United States Patent [19]

Uenaka et al.

[11] Patent Number: 5,162,058
[45] Date of Patent: Nov. 10, 1992

[54] COATING POWDER COMPOSITION

[75] Inventors: Akimitsu Uenaka; Yuji Toyoda; Tasaburo Ueno, all of Osaka; Koichi Tsutsui, Kyoto, all of Japan

[73] Assignee: Nippon Paint Co., Ltd., Osaka, Japan

[21] Appl. No.: 479,530

[22] Filed: Feb. 13, 1990

[30] Foreign Application Priority Data

Feb. 16, 1989 [JP] Japan .................. 1-36886

[51] Int. Cl.$^5$ ............................................. C08L 63/00
[52] U.S. Cl. ......................... 106/287.24; 106/287.23; 525/438; 428/413
[58] Field of Search ................ 525/438; 106/287.24, 106/287.23

[56] References Cited

U.S. PATENT DOCUMENTS 4,087,479  5/1978  Toyota et al. ................ 525/438
4,147,737  4/1979  Sein et al. ................... 525/438

Primary Examiner—William R. Dixon, Jr.
Assistant Examiner—C. Melissa Bonner
Attorney, Agent, or Firm—Wenderoth, Lind & Ponack

[57] ABSTRACT

The invention concerns a coating powder composition comprising (A) a carboxyl group containing polyester resin having a number average molecular weight of 1,000~20,000, an acid value of 10~100, a glass transition temperature of 35°–120° C. and an SP value of 9.8~11.5, and (B) glycidyl trimellitate, wherein the equivalent weight ratio of carboxyl the groups of said (A) to the glycidyl groups of said (B) is 1:2 to 2:1. The coating powder composition is specifically suitable for a high-temperature-short time baking and capable of resulting in a coating having excellent film properties including bending and processability and which coating is highly-crosslinked.

1 Claim, No Drawings

COATING POWDER COMPOSITION

FIELD OF THE INVENTION

The present invention relates to a coating powder composition which is specifically suitable for a high-temperature-short time baking and capable of producing a coating which is highly crosslinked and excellent in film properties, especially with respect to processability and bending properties.

BACKGROUND OF THE INVENTION

Recently, public attention has been directed to a coating powder comprising, as principal ingredients, a polyester resin and a crosslinking agent, as a pollution-free coating composition capable of producing a coating which is excellent in corrosion resistance, chemical resistance, mechanical strength and adhesion to steel or the like. Usually, a blocked polyisocyanate compound is used as a crosslinking agent for hydroxyl group bearing polyester resins, however, in this combination, a blocking agent is used which is vaporized at the stage of baking the formed coating, causing troubles in working the coating. Therefore, there is preferred the use of combination of a carboxyl bearing polyester resin and a crosslinking agent selected from glycidyl or oxirane group bearing epoxy resins or compounds, with the exception of toxic triglycidyl isocyanurate. Examples of such crosslinking agents are bifunctional epoxy resins or compounds such as bisphenol type glycidyl ethers, diglycidyl ethers of dialcohols (Japanese Patent Publication (unexamined) 151224/75), diglycidyl terephthalate (Japanese Patent Publication (unexamined) 243176/88) and the like, and polyfunctional epoxy resins or compounds such as aliphatic hydrocarbon glycidyl ethers, novolak type epoxy resins (Japanese Patent Publication (unexamined) 28092/72) and the like. With the increase in demand of coating powder which is specifically suitable for a high-temperature and short time baking as required for the coating of electrical appliances, office supplies or the like, much importance is attached to the use of to trifunctional or more highly functional epoxy resins or compounds to increase the crosslinking density. However, heretofore proposed aliphatic hydrocarbon glycidyl ethers do not give the desired increase in the degree of crosslinking and novolak type epoxy resins, while increasing the crosslinking, inevitably result in a decrease in bending processability and often result in a yellowish coating. Thus, none of the known polyfunctional epoxy resins or compounds satisfy the simultaneous improvement in the degree of crosslinking and bending properties.

It is, therefore, an object of the invention to discover a polyfunctional epoxy resin or compound which is free from dermal toxity is easy to use in operation and which is useful as a crosslinking agent for carboxyl group containing polyester resins, such as to produce a highly crosslinked resin having excellent properties especially bending properties. The principal object of this invention is to provide a coating powder composition comprising such polyfunctional epoxy resin or compound and carboxyl group containing polyester resin, which is suitable for a high temperature and short time baking and capable of resulting in a coating with excellent solvent resistance, impact resistance, bending properties and other mechanical strengths.

SUMMARY OF THE INVENTION

According to the present invention, the abovementioned objects can be attained by providing a coating powder composition comprising, as principal ingredients, (A) a carboxyl group containing polyester resin prepared by the reaction of at least one polybasic acid and at least one polyhydric alcohol and having a number average molecular weight of 1,000 to 20,000, an acid value of 10 to 100, a glass transition temperature of 35° to 120° C. and a SP (solubility parameter used to show the solubility characteristics) value of 9.8 to 11.5, and (B) glycidyl trimellitate, wherein the equivalent weight ratio of the carboxyl groups of said (A) to glycidyl groups of said (B) is 1:2 to 2:1.

The inventors, having studied various combinations of carboxyl bearing polyesters and polyfunctional epoxy compounds, have found that particular combinations of specific polyester resins and glycidyl trimellitate are suitable for a high-temperature short period baking and are useful as resinous components for coating powder capable of producing a coating with excellent solvent resistance, impact resistance, bending properties and other mechanical strengths. On the basis of said finding the present invention has been accomplished. The polyester resin used in the invention should have a number average molecular weight of 1,000 to 20,000. If the number average molecular weight is less than 1,000, it will result in a coating with deficient film strength, whereas if it exceeds over the upper limit of 20,000, it is incapable of producing a coating having a good appearance because of the insufficient flowability of the polyester resin.

Secondly, such polyester resin should have a glass transition temperature (Tg) of 35°~120° C., because if lower than 35° C. there is an undesired lowering in blocking resistance of the coating powder and if it exceeds 120° C., the flowability of the coating formed is poor. The polyester resin should also have an acid value of 10 to 100.

If the acid value is less then 10, this results in a coating with deficient film strength and if it is more than 100, it results in a coating having deficient flexibility.

Furthermore, the polyester resin should have an SP value of 9.8 to 11.5.

This requirement should is important, because of the use of a particular epoxy compound, i.e. glycidyl ester of trimellitic acid, as a crosslinking agent, in this invention. If the SP value of the polyester resin is less than 9.8 or more than 11.5, such polyester resins are hardly compatible with the abovementioned epoxy compound, and hence, there results in coatings having deficient film strength making it impossible to attain the objects of this invention.

As far as the abovementioned requirements are fulfilled, any of the known, polyester resin coatings may be satisfactorily used as the carboxyl group containing polyester components in the present invention.

As an acidic component of such polyester resin, any of the following may be advantageously used:
terephthalic acid, isophthalic acid, phthalic acid, methyl phthalic acid, trimellitic acid, pyromellitic acid, adipic acid, sebacic acid, succinic acid, maleic acid, fumaric acid, tetrahydrophthalic acid, methyl tetrahydrophthalic acid, hexahydrophthalic acid,

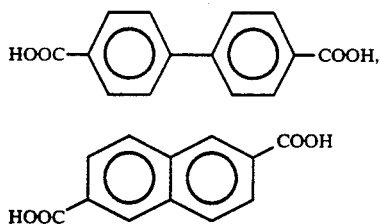

and their reactive derivatives, as, for example, acid anhydrides, acid halides, acid esters and the like.

As the other component of alcohol, the following may be advantageously used:

ethylene glycol, propylene glycol, 1,3-butanediol, 1,4-butanediol, 1,6-hexanediol, diethylene glycol, dipropylene glycol, 1,4-cyclohexane dimethanol, 1,4-cyclohexanediol,

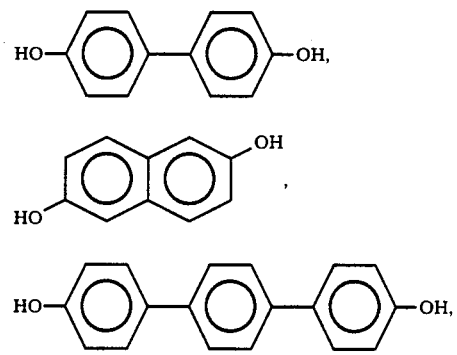

neopentyl glycol, isopentyl glycol, bishydroxyethyl terephthalate, hydrogenated bisphenol A, hydrogenated bisphenol A-alkylene oxide addition product, trimethylol ethane, trimethylolpropane, glycerin, pentaerythritol and the like.

A compound having both acidic groups and hydroxyl groups may also be used as a reactive polyfunctional compound. The polyester forming reaction may be carried out in one step or in several steps as known in the art.

The inventors have also found that when the alcohol component consists of 75% or more of the total alcohol of neopentyl glycol and 25% or less of another alcohol, there results in a coating with particularly excellent weather resistance in this invention. The Tg and SP values of the polyester resin may be easily controlled by those skilled in the art by the selection of types and amounts of the starting materials used and number average molecular weight and acid value by the selection of reaction conditions adopted. Therefore, it would not be necessary to explain the details herein.

In this invention, the abovementioned carboxyl group containing polyester resin is co-used with a particular crosslinking component of glycidyl trimellitate. At that time, both components should be compounded so as to give the equivalent weight ratio of carboxyl groups to glycidyl groups of 1:2 to 2:1, preferably 1:2 to 1.5:1. This is because, if the said equivalent weight ratio is lower than 1:2, there results in a coating with deficient crosslinking and if it exceeds 2:1, a coating with deficient bending properties is produced due to a high degree of crosslinking. By the selective use of the abovementioned polyester resin and the particular crosslinking agent, it is possible to prepare a coating powder which may result in a coating, such that by a high-temperature and short time baking, e.g. 250° C.–5 minutes baking, a highly crosslinked coating is produced having excellent film properties and especially bending properties.

The inventors have also found that even if the glycidyl trimellitate of the abovementioned composition is replaced up to 40% by weight by an diepoxide having in its molecule, two glycidyl groups and/or aliphatic glycidyl ether having in its molecule three glycidyl groups, similar effects of the invention can be attained with the thus obtained composition, and in that case, the boiling water resistance of the formed coating is greatly improved. Therefore, in a particularly preferable embodiment of this invention, there is provided a coating powder composition comprising, as principal ingredients, (A) a carboxyl group containing polyester resin prepared by the reaction of at least one polybasic acid and at least one polyhydric alcohol and having a number average molecular weight of 1,000 to 20,000, an acid value of 10 to 100, a glass transition temperature of 35° to 120° C. and an SP value of 9.8 to 11.5, (B) glycidyl trimellitate, and (C) diepoxide having in its molecule two glycidyl groups and/or aliphatic glycidyl ether having in its molecule three glycidyl groups, the amount of said (C) being up to 40% by weight of said (B) and wherein the equivalent weight ratio of the carboxyl groups of said (A) to the glycidyl groups of said (B) and (C) is 1:2 to 2:1.

Examples of diepoxides having in its molecule two epoxy groups are (1) glycidyl ethers obtained by the reaction of phenolic compounds as 2,2-bis(4'-hydroxyphenyl)propane (bisphenol A) and the like, and epichlorohydrin;

(2) glycidyl ethers obtained by the reaction of alcohols and epichlorohydrin, as, for example, the diglycidyl ether of butanediol, the diglycidyl ether of polypropylene glycol, and the diglycidyl ether of neopentyl glycol;

(3) glycidyl ethers obtained by the reaction of carboxyl bearing compounds as adipic acid, phthalic acid and the like and epichlorohydrin, as, for example, diglycidyl butyrate, diglycidyl terephthalate, diglycidyl isophthalate, diglycidyl phthalate, diglycidyl ester of linoleic dimer acid; and (4) a styrene oxide derived from a mono-unsaturated compound, or an inner epoxy type compound synthesized by the oxidation of an intramolecular double bond, and the like.

Among them, particular preference is given to the diglycidyl ether of bisphenol A, the diglycidyl ester of butyric acid and the like. Examples of aliphatic glycidyl ether having in its molecule three glycidyl groups are diglycerol polyglycidyl ether, trimethylolpropane polyglycidyl ether, glycerol polyglycidyl ether and the like.

In the present composition, various additives may be added as desired. Examples of these additives are:

(a) surface conditioners for the improvement in smoothness and control of cratering of the coating, as long chain alkyl esters of acrylic acid, polysiloxane and the like;

(b) color pigments including both inorganic pigments as titanium dioxide, iron oxide, iron oxide yellow, carbon black and the like, and organic pigments such as phthalocyanine blue, phthalocyanine green, quinacridone red pigment and the like;
(c) plasticizers as, for example, polyalkylene polyol, phthalic acid ester and the like;
(d) anti-oxidants;
(e) pinhole controlling agents such as benzoin and the like;
(f) epoxy compounds and the like.

In preparing coating powder from the present coating powder composition, any of the conventional methods may be advantageously used. For example, the defined constituting components are mixed together, melt-kneaded, allowed to cool and pulverized; or each of the components is dissolved in a solvent, the formed solutions are mixed together and the thus obtained solution is then subjected to spray-drying to obtain a coating powder. The present coating powder may be advantageously applied onto a substrate by using any of the conventional means, as, for example, electrostatic spraying, fluidized bed coating and the like.

The invention shall be now more fully explained in the following examples. Unless otherwise being stated, all parts and % are by weight.

EXAMPLE 1

10 Parts of UPICA Coat D-19-5(trademark, Nihon Upica K.K., carboxyl group containing polyester resin having a number average molecular weight of about 4,500, Tg value of 56, acid value of 29 and SP value of 10.8), 0.98 part of glycidyl trimellitate, 6.1 parts of TIE-PAKE CR-50 (trademark, Ishihara Sangyo K.K., titanium oxide), 0.043 part of YF-3919 (silicon surface conditioner, manufactured by Toshiba Silicon K.K.) and 0.105 part of benzoin were pre-mixed, melt-mixed at 100° C., and the melt was allowed to cool and solid mass was pulverized to obtain coating powder.

EXAMPLES 2 TO 4 AND COMPARATIVE EXAMPLES 1 TO 6

Using the materials shown in Table 1 and following the procedures stated in Example 1, various coating powders were prepared In the following Table 1, V-73-9 is a carboxyl group containing polyester resin manufactured by EMS, having a number average molecular weight of 4,000, a Tg value of 48, acid value of 33 and SP value of 10.6;

FINEDIC M-8630 is a carboxyl group containing polyester resin manufactured by Dainippon Ink K.K., having a number average molecular weight of 4,500, Tg of 51, acid value of 25 and SP value of 10.6;

Finedic M-8076 is a hydroxyl group containing polyester resin manufactured by Dainippon Ink K.K., having a number average molecular weight of 4,000 and a hydroxyl value of 43;

Resin A used for comparison purpose is a carboxyl containing polyester resin prepared by the reaction of terephthalic acid, hexahydrophthalic acid and cyclohexanedimethanol, having a number average molecular weight of 4,500, an acid value of 33, a Tg value of 55 and an SP value of 9.5;

YD-128 is a bisphenol A glycidyl ether type epoxy resin having an epoxy equivalent of 190, manufactured by Tohto Kasei K.K.;

EX-421 is an aliphatic hydrocarbon glycidyl ether type epoxy resin having an epoxy equivalent of 155, manufactured by Nagase Kasei K.K.;

EPPN-201 is a phenol Novolak type epoxy resin having an epoxy equivalent of 185, manufactured by Nihon Kayaku K.K.;

KRELAN UI-B is a blocked isocyanate having NCO equivalent of 365, manufactured by Bayer; and CUREZOL C-17Z (2-heptadecylimidazole) is a trademark of Shikoku Kasei K.K. is a curing catalyst.

Next, the abovementioned coating powders each was applied by electrostatic spraying onto a zinc phosphated steel plate (0.6 mm thickness) and heat-cured at 250° C. for 5 minutes to obtain a coated test plate, which was then subjected to a series of tests for evaluating the film properties. The test results are shown in the following Table 2. Test methods and evaluation standards used are as follows:

Bending property test:

JIS 5400-6-16

Number of coated sheets placed in the bended opening was used as an evaluation value. The smaller the value, the higher the bending property.

Non-volatile content test:

Test coating powder was applied by spraying onto a steel plate and the coated plate was baked at 250° C. for 5 minutes.

Non-volatile content (%) was determined at that stage.

Degree of crosslinking:

Xylene rubbing test was carried out.

◯ ... good  x ... no good

Evaluation of yellowing:

Baked test plate was tested by using SM color computor (Suga Shikenki K.K.) to determine the b value.

The larger the b value, the severer the yellowing.

SP value determination:

test temperature: 20° C.

sample: 0.5 g of resin was weighed in 100 ml beaker. 10 ml of THF were added by using a pipette and dissolved by means of magnetic stirrer.

cloud point determination:

Using a 50 ml biuret, poor solvent (n-hexane, DIW) was dropwise added and the added amount was measured at the point when a turbid mixture was obtained. The Cloud Point, and V were calculated by using the following equation.

$$V_m = V_1 V_{THF}/(\phi_1 V_{THF} + \phi_{THF} V_1)$$

$$\delta_m^2 = \phi_1 \delta_1^2 + \phi_{THF} \delta_{THF}^2$$

in which $V_1$: molecular volume (ml/mol) of solvent $\phi_1$: volume fraction of poor solvent at the could point $\delta_1$: SP value of solvent $V_{THF}$: molecular volume (p1.08) cf THF $\phi_{THF}$: volume fraction of THF at the could point $\delta_{THF}$: SP value (9.52) of THF SP value of resin can be calculated as follows:

$$\delta^2 = (V_{m1}\delta_{m1} + V_{mh}\delta_{mh})/(V_{m1} + V_{mh})^*$$

in which $V_{m1}$: molecular volume of mixture with hexane as poor solvent $\delta_{m1}$: SP value of mixture with hexane as poor solvent
$V_{mh}$: molecular volume of mixture with water as poor solvent
$\delta_{mh}$: SP value of mixture with water as poor solvent
\* . . . The abovementioned is a modification of SUH-CLARKE'S equation shown in J.P.S.A.-1,5,1671 to 1681(1967) modified by Nippon Paint Co.

Boiling water resistance:

A coated test plate was dipped in boiling water for 2 hours and then allowed to stand at room temperature for 30 minutes. Thereafter, a change given by cross-cut (1 m/m) was imparted by a knife onto the coating and a tape peeling test was carried out. The boiling water resistance was evaluated by checking the remaining percentage of the film cuts.

| 100/100 | completely remained |
|---|---|
| 0/100 | totally peeled out |

Weather resistance:

A Sun-Shine weather-O-meter test was carried out. After measuring the gloss value, the weather resistance was evaluated by the gloss retention percentage.

TABLE 1

| | Example | | | | Comp. Ex. | | | | | |
|---|---|---|---|---|---|---|---|---|---|---|
| | 1 | 2 | 3 | 4 | 1 | 2 | 3 | 4 | 5 | 6 |
| Polyester resin | | | | | | | | | | |
| UPICACOAT D-19-5 | 10 | | | | | | 10 | | | |
| V-73-9 | | 10 | 10 | 10 | | | | | | |
| FINEDIC M-8630 | | | | | | 10 | 10 | | 10 | |
| FINEDIC M-8076 | | | | | | | | | | 10 |
| Resin A | | | | | 10 | | | | | |
| Crosslinking agent | | | | | | | | | | |
| glycidyl trimellitate | 0.98 | 0.12 | 1.46 | 0.90 | 1.04 | | | | | |
| YD-128 | | | | 0.25 | | 0.97 | 0.97 | | | |
| EX-421 | | | | | | | | 0.92 | | |
| EPPN-201 | | | | | | | | | 0.95 | |
| KRELAN UI-B | | | | | | | | | | 3.21 |
| Other | | | | | | | | | | |
| CUREAZOL C-172 | | | | | | | 0.334 | | | |
| CR-50 | 6.1 | 6.2 | 6.4 | 6.2 | 6.1 | 6.1 | 6.1 | 6.1 | 6.1 | 7.4 |
| YF-3919 | 0.043 | 0.043 | 0.043 | 0.043 | 0.043 | 0.043 | 0.043 | 0.043 | 0.043 | 0.043 |
| BENZOIL | 0.105 | 0.105 | 0.105 | 0.105 | 0.105 | 0.105 | 0.105 | 0.105 | 0.105 | 0.105 |

TABLE 2

| | Example | | | | Comp. Ex. | | | | | |
|---|---|---|---|---|---|---|---|---|---|---|
| | 1 | 2 | 3 | 4 | 1 | 2 | 3 | 4 | 5 | 6 |
| Solvent resistance | ○ | ○ | ○ | ○ | ○ | X | ○ | Δ | ○ | ○ |
| bending property | 0 T | 0 T | 0 T | 0 T | 5 T | 6 T | 0 T | 2 T | 6 T | 0 T |
| yellowing | 1.0 | 1.1 | 0.9 | 1.1 | 1.1 | 1.0 | 2.9 | 1.8 | 2.0 | 1.8 |
| non-volatile content | 97.1 | 97.0 | 96.8 | 97.0 | 96.7 | 97.0 | 97.2 | 96.9 | 96.8 | 91.9 |
| Boiling water resistance | 80/100 | 80/100 | 80/100 | 100/100 | 80/100 | 80/100 | 100/100 | 80/100 | 80/100 | 100/100 |
| Weather resistance | 25 | 45 | 45 | 43 | 30 | 26 | 27 | 24 | 18 | 40 |

What is claimed is:

1. A coating powder composition comprising, as principal ingredients, (A) a carboxyl group containing polyester resin prepared by the reaction of at least one polybasic acid and at least one polyhydric alcohol and having a number average molecular weight of 1,000 to 20,000, an acid value of 10 to 100, a glass transition temperature of 35° to 120° C. and a solubility parameter value of 9.8 to 11.5, and wherein 75% or more by weight of the polyhydric alcohol of the polyester resin is neopentyl glycol, and (B) glycidyl trimellitate, wherein the equivalent weight ratio of the carboxyl groups of said (A) to the glycidyl groups of said (B) is 1:2 to 2:1, and (C) wherein a part, up to 40% by weight, of the glycidyl trimellitate is replaced by at least one other glycidyl compound selected from the group consisting of a diepoxide having in its molecule two glycidyl groups and an aliphatic glycidyl ether having in its molecule three glycidyl groups.

\* \* \* \* \*